(12) United States Patent
Ahles et al.

(10) Patent No.: US 7,346,575 B1
(45) Date of Patent: Mar. 18, 2008

(54) SYSTEMS AND METHODS FOR SELECTIVELY DELAYING FINANCIAL TRANSACTIONS

(75) Inventors: Daniel Ahles, Houston, TX (US); Randy Templeton, Sugar Land, TX (US)

(73) Assignee: First Data Corporation, Greenwood, CO (US)

( * ) Notice: Subject to any disclaimer, the term of this patent is extended or adjusted under 35 U.S.C. 154(b) by 1445 days.

(21) Appl. No.: 10/041,954

(22) Filed: Jan. 7, 2002

(51) Int. Cl.
*G06Q 40/00* (2006.01)

(52) U.S. Cl. .......................................... 705/38; 705/37

(58) Field of Classification Search ............. 705/30–42
See application file for complete search history.

(56) References Cited

U.S. PATENT DOCUMENTS

| | | |
|---|---|---|
| 5,175,682 A | 12/1992 | Higashiyama et al. |
| 5,444,616 A | 8/1995 | Nair et al. |
| 5,679,940 A | 10/1997 | Templeton et al. |
| 5,848,412 A | 12/1998 | Rowland et al. |
| 5,930,777 A | 7/1999 | Barber |
| 5,991,758 A | 11/1999 | Ellard |
| 6,097,834 A | 8/2000 | Krouse et al. |
| 6,117,011 A | 9/2000 | Lvov |
| 6,260,024 B1 * | 7/2001 | Shkedy .................... 705/37 |

\* cited by examiner

*Primary Examiner*—Frantzy Poinvil
(74) *Attorney, Agent, or Firm*—Knobbe, Martens, Olson & Bear, LLP

(57) ABSTRACT

A risk system that performs a risk assessment of a financial transaction to obtain an initial risk score. Based on the initial risk score, the risk system performs at least one post-score assessment by selectively utilizing various scoring engines and databases. The at least one post-score risk assessment may include delaying the shipment of merchandise in financial transactions that are of marginal risk to thereby provide a check acceptance service with more time to further evaluate the financial transaction risks. Thus, marginally risky financial transactions that are likely to benefit the check acceptance service and a merchant that subscribes to the check acceptance service are authorized for increased profitability and customer satisfaction. Furthermore, the post-score risk assessment may approve or authorize financial transactions that generally fail standard risk assessments that use a cut-off risk score to divide the financial transactions into either approved or declined groups. As a result, the post-score assessment process efficiently re-evaluates some of the borderline exception cases for the purpose of securing beneficial financial transactions.

61 Claims, 5 Drawing Sheets

SYSTEMS AND METHODS FOR SELECTIVELY DELAYING FINANCIAL TRANSACTIONS

BACKGROUND OF THE INVENTION

1. Field of the Invention

The present invention relates to financial transactions and, in particular, to a system and method of risk assessment, whereby provisional authorization may be granted to a merchant for the selective delay of a financial transaction.

2. Description of the Related Art

A typical financial transaction involves a form of payment in exchange for vendibles, such as services and/or merchandise, at a point of sale. In most instances, a customer provides the form of payment, such as a promissory check draft, to a merchant in exchange for the vendibles. The check draft is often regarded as a promissory payment that instructs the customer's bank to pay the merchant. As is generally known, the funds promised to the merchant by the check draft are sometimes not paid due to reasons, such as insufficient funds in the customer's checking account or fraud. Unfortunately, the merchant may be susceptible to risk whenever a check draft is received as payment for services and/or merchandise.

Sometimes, the merchant may choose to manage risk by maintaining one or more local databases that may include, for example, a list of customers or check writers that have written bad checks in the past. Such databases may range from a simple list on paper for a small store owner to a computer network for a chain store. Unfortunately, managing such databases requires use of merchant resources that could otherwise be used more beneficially.

Alternatively, the merchant may choose to manage risk by subscribing to an agency that assess the risk associated with promissory check related financial transactions. Examples of a risk assessment agency include TeleCheck. For a given transaction, a subscribed merchant sends a transaction approval request to the agency with information, such as promissory check draft amount, check identifying information, and information about the check writer. The agency assesses the risk and generates a risk score based on the information received. The agency then either approves or declines the transaction based on the generated risk score. The level of subscription to such an agency may vary, from an approval service to the agency assuming the risk of the transaction by either guaranteeing the check or purchasing the check from the merchant. Thus, it is in the interest of the agency to accurately assess the risks associated with financial transactions.

A conventional check approving process may comprise a cutoff risk score such that a transaction whose risk score is higher than the cutoff risk score is approved. Conversely, a transaction whose risk score is lower than the cutoff risk score is declined. In addition, a borderline risk score is positioned somewhere between the low risk score and the high risk score, which is somewhat near the cutoff risk score. Consequently, since the above-mentioned check approval process is generally configured to statistically favor the merchant or the check approving agency in terms of probable risk, borderline risk assessments are often declined in many check transactions that correspond to borderline risk scores.

For example, if the generated risk score is substantially equivalent to the cutoff risk score, which corresponds to a borderline or marginal risk score, then the merchant and/or the check approving agency typically declines the financial transaction and the customer is required to present another form of payment or abandon the requested financial transaction altogether. In many cases, marginal risk situations result in lost revenue for the merchant due to the occurrence of borderline or marginal risk assessment declines.

In certain high risk environments, it may be necessary to issue a high number of risk based declines to protect the merchant and the check approving agency from high returned check rates. Unfortunately, issuing the high number of risk declines results in customers becoming irate, merchants losing sales, and interferes with the check approving agency's ability to assess marginal risk at higher turndown levels. Therefore, some conventional check approval agencies are substantially deficient in managing marginal risk and may require significant improvement. Furthermore, the authorizational processing, temporal risk, and lack of flexibility to manage procedural variations and/or borderline risk scores by conventional check approval agencies may also require significant improvement.

SUMMARY OF THE INVENTION

The present invention provides a method and system which selectively delays the financial transaction until further transaction information may be obtained and processed for review and evaluation in borderline or marginal risk assessment situations. In one embodiment, a method of assessing risk associated with a financial transaction is described herein below, wherein a customer is attempting to pay for vendibles from a merchant via a promissory payment. The method comprises, first, receiving transaction information from the merchant at a point of sale, wherein the transaction information identifies the customer, the merchant, and includes data about the financial transaction. Next, the method further comprises assessing the risk of the financial transaction using at least one mathematically based scoring engine to obtain a risk value.

Additionally, the method further comprises determining if the risk value indicates that the risk is in a first classification of risk wherein additional information about the customer may result in the risk value being positioned within a second classification of risk for which acceptance of the promissory payment as payment for the vendibles is warranted. Moreover, the method comprises provisionally authorizing acceptance of the promissory check if the risk value determination indicates that the risk value is in the first classification, and communicating the provisional authorization to the merchant at the point of sale to thereby indicate to the merchant to accept the tendered promissory payment but to hold delivery of the vendibles for a pre-selected period of time.

Furthermore, the method comprises obtaining additional financial data about the customer during the pre-selected period of time to determine if the risk value can be positioned within the second classification, and authorizing delivery of the vendibles after the pre-selected period of time when the additional financial data about the customer indicates that the risk value can be positioned in the second classification.

In one aspect, the method may further comprise determining if the merchant is a merchant who can delay delivery of the vendibles and wherein communicating the provisional authorization to the merchant occurs only if the merchant is determined to be a merchant who can delay delivery of the vendibles. In addition, assessing risk associated with the financial transaction may correspond to assessing risk associated with an internet based financial transaction and/or a mail order based financial transaction.

In another aspect, authorizing delivery after the pre-selected period of time may comprise contacting the merchant and advising the merchant to deliver the vendibles and wherein authorizing delivery after the pre-selected period of time comprises agreeing with the merchant that unless the merchant is advised to not ship at the end of the pre-selected period of time, the delivery of the vendibles is authorized. Additionally, the pre-selected period of time may range from at least one micro-second to a few weeks.

In still another aspect, obtaining additional financial information about the customer may comprise verifying availability of funds in a checking account belonging to the customer to cover the cost of the financial transaction. In addition, obtaining additional financial information about the customer may further comprise obtaining information about the customer's recent check writing history and evaluating the customer's recent check writing history to predict whether there will be sufficient funds to cover the cost of the financial transaction. Moreover, attempting to pay via the promissory payment may comprise attempting to pay via a check, an electronic check, and/or a paper check, and wherein attempting to pay for vendibles may comprises attempting to pay for services and/or merchandise.

In yet another aspect, determining if the risk value indicates that the risk is in the first classification may comprise assessing a marginal risk assessment, wherein the marginal risk assessment is between a low risk assessment and a high risk assessment. Also, determining if the risk value indicates that the risk is in the second classification may comprise assessing a low risk assessment.

In another embodiment, a system of assessing risk associated with a financial transaction is described herein below, wherein a customer is attempting to pay for vendibles from a merchant via a promissory payment. The system comprises a risk assessment component that is configured to perform a risk assessment of the financial transaction using at least one scoring engine to generate a risk score based on transaction information obtained from the merchant via an interface component, wherein the transaction information identifies the customer, the merchant, and includes data about the financial transaction.

In addition, the system further comprises a processing component that is configured to determine a marginal risk assessment if the risk score is in a borderline classification of risk, wherein additional customer information may result in the risk score being positioned within a low classification of risk for which acceptance of the promissory payment for the vendibles is authorized.

Moreover, the system further comprises a communications component that is configured to communicate with the merchant, wherein the communication component notifies the merchant at the point of sale, and wherein the notification instructs the merchant to accept the tendered promissory payment but to delay delivery of the vendibles for a period of time, wherein, during the period of time, additional financial data about the customer is obtained via the interface device to re-assess the risk associated with the financial transaction.

In one aspect, the system may comprise an authorization component that is configured to authorize delivery of the vendibles after the period of time when the additional financial data about the customer indicates that the risk score can be re-positioned in the low classification of risk. The authorization component may further comprise a communications device and contacts the merchant via communications medium and advises the merchant to deliver the vendibles to the customer. The authorization component may be used to authorize the delivery of the vendibles after the period of time unless the merchant is advised to not ship at the end of the period of time by the authorization component. Also, the period of time ranges from at least one micro-second to a few weeks.

In another aspect, the processing component is further configured to determine if the merchant is a merchant who can delay delivery of the vendibles, wherein the processing component determines the marginal risk assessment only if the merchant is determined to be a merchant who can delay delivery of the vendibles. Additionally, the financial transaction is an internet based financial transaction and/or a mail order based financial transaction.

In another aspect, the system is may be configured to acquire additional customer information and verify the availability of funds in a checking account belonging to the customer to cover the cost of the financial transaction, wherein the additional customer information comprises transaction information about the customer's recent check writing history. In addition, the processing component may also be configured to evaluate the customer's recent check writing history to predict whether there will be sufficient funds to cover the cost of the financial transaction.

These and other objects and advantages of the present invention will become apparent from the following description taken in conjunction with the accompanying drawings.

BRIEF DESCRIPTION OF THE DRAWINGS

These and other aspects, advantages, and novel features of the invention will become apparent upon reading the following detailed description and upon reference to the accompanying drawings. In the drawings, similar elements have similar reference numerals.

DETAILED DESCRIPTION OF THE PREFERRED EMBODIMENT

Figure 1:
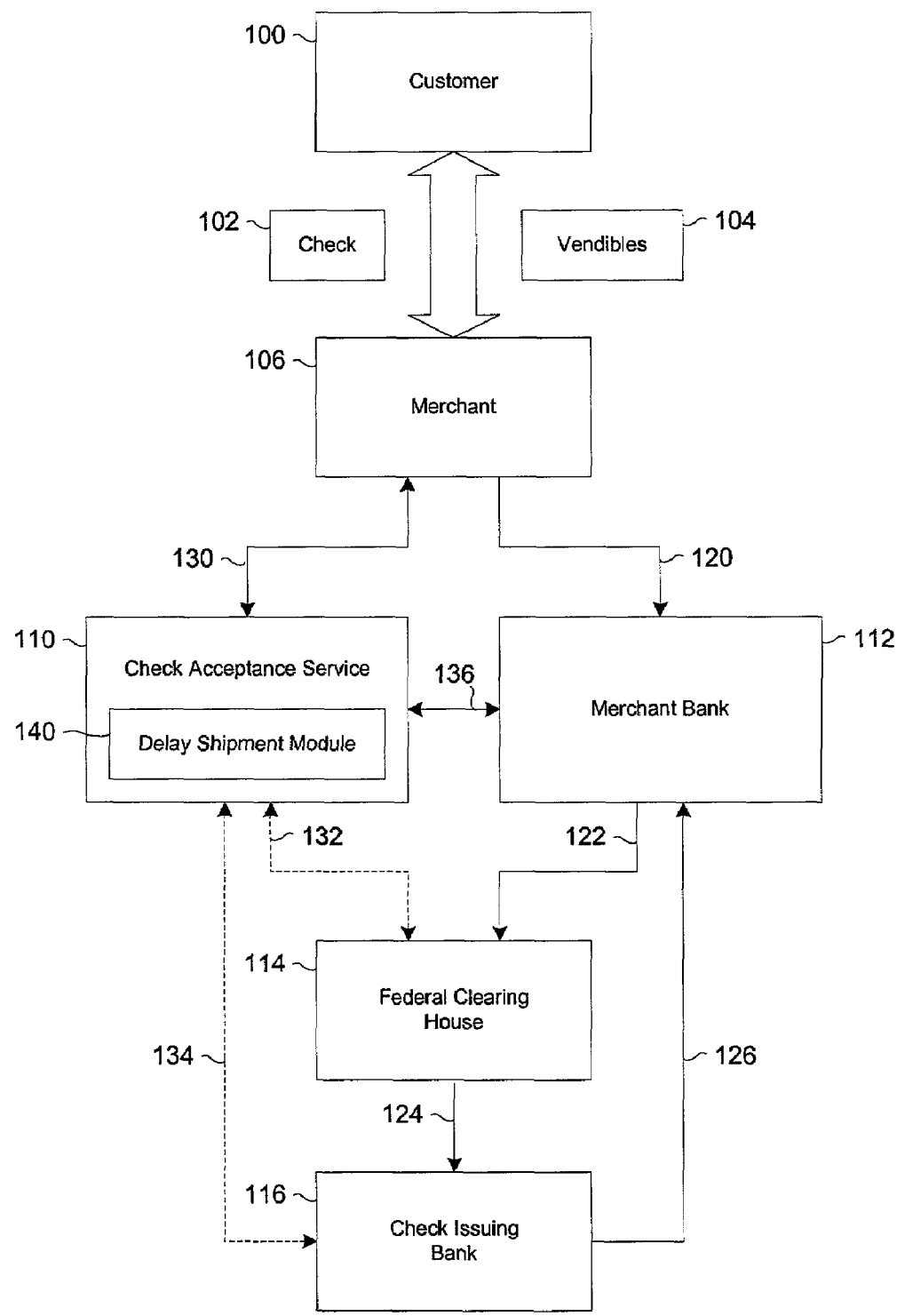
FIG. 1 illustrates one embodiment of a financial transaction involving a check draft and a check acceptance service.

Reference will now be made to the drawings wherein like numerals refer to like parts throughout. FIG. 1 illustrates one embodiment of a financial transaction involving a promissory check draft. In this particular embodiment, a customer 100 provides the check draft 102 to a merchant 106 or service entity in exchange for vendibles 104, such as a service or merchandise. The check draft 102 may be accepted and deposited into a merchant bank 112 without receiving any external authorization as indicated by path 120.

In one aspect, the check draft 102 is electronically transferred through a clearing process, wherein the merchant bank 112 transfers the check draft 102 to a federal clearing house (FCH) 114 as indicated by path 122. In turn, the federal clearing house 114 transfers the check draft 102 to the check issuing bank 116 as indicated by path 124. In one aspect, if the check draft 102 is determined to be valid by the check issuing bank 116, then the check "clears" and the amount of the check 102 is debited from the customer's 100 checking account in the check issuing bank 116, and the debited amount is subsequently transferred to the merchant's 104 account in the merchant bank 112 as indicated by path 126.

In some financial transactions, the check draft 102 may not clear for various reasons. As a result, the merchant's 106 bank account is not credited with the check amount. For example, the check issuing bank 116 may provide a non-sufficient fund (NSF) statement corresponding to the customer's 102 checking account, a stop payment request by the customer 100, and/or a fraudulent check issuance. Unfortunately, if the check draft 102 fails to clear, the merchant 106 is left with the responsibility of collecting the proper funds or the vendibles 104 from the customer 100. In some instances, the merchant 106 may be unsuccessful in reclaiming the proper funds in a collection process, and the already released merchandise may be written off as a loss.

Alternatively, even when the merchant is successful in reclaiming the funds, the collection process significantly increases the merchant's 106 costs associated with the financial transaction. To reduce the occurrence of further loss from the same "bad" check writer or customer 100, the customer's 102 name may be added to a negative list, such as an internal or local database. However, the local database may offer only limited protection against "bad" check writers, who may have previously bounced checks in the merchant's 106 establishment. Furthermore, "bad" check writers, who may not have previously bounced checks in the merchant's 106 establishment, but have a history of bouncing checks or writing fraudulent checks elsewhere, are unlikely to be detected by such a local database.

As a consequence, most merchants decide to subscribe to and rely on a check acceptance service 110 to manage risks associated with accepting checks from customers. The interaction between the merchant 106 and the check acceptance service 110 is indicated by path 130. It should be appreciated that the scope of a subscription service that the merchant 106 subscribes to may vary depending on the needs of the merchant 106.

In one embodiment, the subscription service may comprise the process of the check acceptance service 110 informing the merchant 106 to accept or refuse the check 102 based on the risk associated with the particular financial transaction. If the check draft 102 is approved and accepted, the check draft 102 is then transferred through the clearing process via the merchant bank 112 in a manner similar to that described above. Unfortunately, if the clearing process is not completed successfully, the merchant 106 usually assumes the risk associated with the financial transaction.

Another embodiment of the subscription service may comprise the process of the check acceptance service 110 guaranteeing the validity of the check 102 based on the risk associated with the particular financial transaction. In this particular embodiment, the check draft 102 is transferred through the clearing process via the merchant bank 112 in a manner similar to the previous description. Fortunately for the merchant 106, if the check 102 fails to clear, the check acceptance service 110 credits the merchant 106 for the amount of the check draft 102 and assumes the responsibility of collecting the funds from the customer 100.

Still another embodiment of the subscription service may comprise the process of the check acceptance service 110 purchasing the check draft 102 outright from the merchant 106 based on the risk associated with the financial transaction. Beneficially, in this particular embodiment, the merchant 106 receives payment for the financial transaction upon approval or authorization from the check acceptance service 110. Furthermore, in some cases, the check acceptance service 110 may be electronically linked to the merchant bank 112, as indicated by path 136, to electronically transfer the necessary funds.

In one aspect, the check acceptance service 110 assumes the responsibility of clearing the check draft 102. For example, the check draft 102 may be transferred from the check acceptance service 110 to the federal clearing house (FCH) 114 as indicated by path 132. Then, the check draft 102 may be transferred to the check issuing bank 116 as indicated by the path 124. In this particular embodiment, if the check 102 is valid or validity may be verified, the necessary funds are transferred from the check issuing bank 116 to the check acceptance service 110 as indicated by path 134.

At this point, the financial transaction is regarded as complete for the check acceptance service 110. However, if the check draft 102 fails to clear with the check issuing bank 116 of the customer 100, then the check acceptance service 110 assumes the responsibility of collecting the necessary funds from the customer 100.

Various subscription services comprise diverse fee schedules that are significantly determined by the risks associated with the encountered financial transactions. It should be appreciated that the success of the check acceptance service 110, including profitability, may substantially depend on accurate risk assessments that may be associated with check related financial transactions. For example, if the check acceptance service 110 provides misguided or erroneous approval decisions to the merchant 106, then the merchant 106 accepts high risk check drafts and/or refuses beneficial customers, which may result in lost revenue or dissatisfied customers. In other situations, the risk is assumed by the check acceptance service 106, and profitability is directly related to the accuracy of risk assessments.

In one embodiment, the technology associated with financial transactions and the electronic transfer of funds by a central financial transaction entity or the check acceptance service 110 include monetary exchange devices, such as check readers, credit card readers, debit card readers, manual input of account information, or some combination thereof for the purpose of obtaining authorization for and settlement of financial transactions at the point of sale. In addition, financial transfer systems may include a point of sale terminal, which may include a display monitor, a printer, magnetic card reader, and a magnetic check reader.

For example, the check draft 102 or a credit card may be presented by the customer 100 to the merchant 106 and swiped through the check reader or magnetic card reader, respectively. In one aspect, the check reader portion of the point of sale terminal identifies, by either magnetic ink character recognition (MICR) or optical character recognition (OCR), the American Banking Association (ABA) account information printed on the face of the check draft 102 or stored in the magnetic strip of the credit card, respectively, and converts the customer's ABA account information to transactional data, which may include digital signals or digital signatures pertaining to the financial transaction.

Transactional data may also include customer 100 identification information, wherein the customer 100 may be required to provide identification, such as a driver's license, or the customer 100 may then be prompted to enter a personal identification number (PIN) associated with corresponding account. The merchant 106 may then enter the pertinent sale data that indicates the amount of the transaction to be authorized, wherein this information may also be converted into transactional data. The resulting collective transactional data is then transferred to the check acceptance service 110 for additional authorizational processing and evaluation. In one aspect, additional authorizational processing and evaluation may include verifying the existence of funds in the customer's check issuing bank account in a manner as described in FIG. 1. Furthermore, obtaining additional financial information about the customer may also comprise obtaining information about the customer's recent check writing history and evaluating the customer's recent check writing history to predict whether there will be sufficient funds to cover the cost of the financial transaction. The customer's check writing history may be logged in an internal database, an external database, and/or saved as a merchant parameter in a memory component.

Additionally, transaction information, including merchant information and customer information, relating to approved and/or declined financial transactions is recorded in a data warehouse of the central financial transaction entity or the check acceptance service 110 for the merchant's 106 future reference, wherein the check acceptance service 110 may generally update transactional information on a daily basis in a batch process, and daily reports may be generated to provide both detailed and summary records of transaction information. Once the transactional data is transferred and received, the check acceptance service 110 may begin authorizational processing by verifying the transactional data with authorization algorithms that may use an ABA account number-PIN pair database and a review of funds verification.

In one aspect, the ABA account number-PIN pair database or some other internal database maintains a file of ABA account information and the personal identification numbers corresponding to respective accounts. In another aspect, the review of funds verification is a system adapted to bi-directionally communicate with a financial institution, such as the check issuing bank 116 to determine that sufficient funds exist in the customer's account for the desired financial transaction.

Alternatively, the check acceptance service 110 may provide provisional authorization 140, in marginal risk assessment situations, to the merchant for the financial transaction. In one embodiment, provisional authorization 140 allows the check acceptance service 110 to selectively re-evaluate the customer's transaction information prior to an approval or decline. In addition, provisional authorization 140 allows the merchant to delay delivery of the vendibles 104 until further risk assessment and/or analysis is processed by the central financial transaction entity or the check acceptance service 110. Advantageously, instead of issuing automatic risk declines for financial transactions that may be categorized as marginally risky, the check acceptance service 110 may provide the merchant 106 a response indicating provisional authorization 140. In some cases, the merchant 106 avoids issuing marginal risk declines, which results in customer satisfaction and increased sales.

Next, the check acceptance service 110 records the MICR information and generates a transactional identification number. If the personal identification number is determined to correspond to the account number and sufficient funds are available in the account, an approval number is assigned to the financial transaction. Additionally, the check acceptance service 110 generates electronic debit and credit files for submission to an automated federal clearing house (FCH) 114 or federal reserve network computer. These electronic files instruct the customer's bank 116 or the paying financial institution to deposit the necessary funds in the merchant's bank 112 or the depositing financial institution. The FCH 114 or federal reserve computers execute the debit and credit file instructions, and the paying financial institution accordingly deposits the customer's funds into the depositing financial institution. Upon receipt by the point of sale terminal of an approval message for the financial transaction, the merchant may issue an instruction to void the financial transaction or to reverse the previous financial transaction instruction in a manner such that the previous instruction credits the merchant's 106 account or credits the customer's 100 account.

In one aspect, a significant advantage is achieved with internet and mail order based financial transactions, where a delivery delay of the vendibles 104 is likely to occur in certain situations. In some instances, a customer 100 may choose to mail a paper check in exchange for ordered vendibles 104, and therefore the customer 100 expects to wait a period of time for delivery. At the time of order, the check acceptance service 110 may obtain transaction information from the customer 100 and verify the existence of funds electronically prior to receiving the paper check. While the paper check is in route to the check acceptance service 110 through standard mail, the check acceptance service 110 may perform various risk assessments, and, depending on the risk assessment, the check acceptance service 110 may notify the merchant 106 to deliver the vendibles 104 or withhold the vendibles 104 until the funds are verified the customer's 100 account. In marginal risk assessment situations, the check acceptance service 110 may provide provisional authorization to the merchant 106, which informs the merchant 106 to delay the delivery of vendibles 106 until further risk assessment is performed. Without departing from the scope of the present invention, it should be appreciated that, at the time of order, the customer 100 may elect to submit an electronic check to the check acceptance service 110 via the merchant 106 in exchange for vendibles 106, wherein the check may be processed electronically.

Advantageously, the above-mentioned financial transfer system represents a significant improvement over traditional check handling procedures that require the transfer of a paper check among various financial institutions. For example, the above-mentioned financial transfer system includes a mechanism for determining borderline or marginal exception conditions, such as utilizing provisional authorization 140 in borderline or marginal risk situations. If borderline exception conditions or marginal risk assessment situations arise, the above-mentioned financial transfer system suggests the delivery delay of vendibles 104 prior to authorizing the financial transaction in a manner such that the customer 100 is marginally inconvenienced, the merchant retains the merchandise, and the check acceptance service reduces the potential loss of funds.

Figure 2:
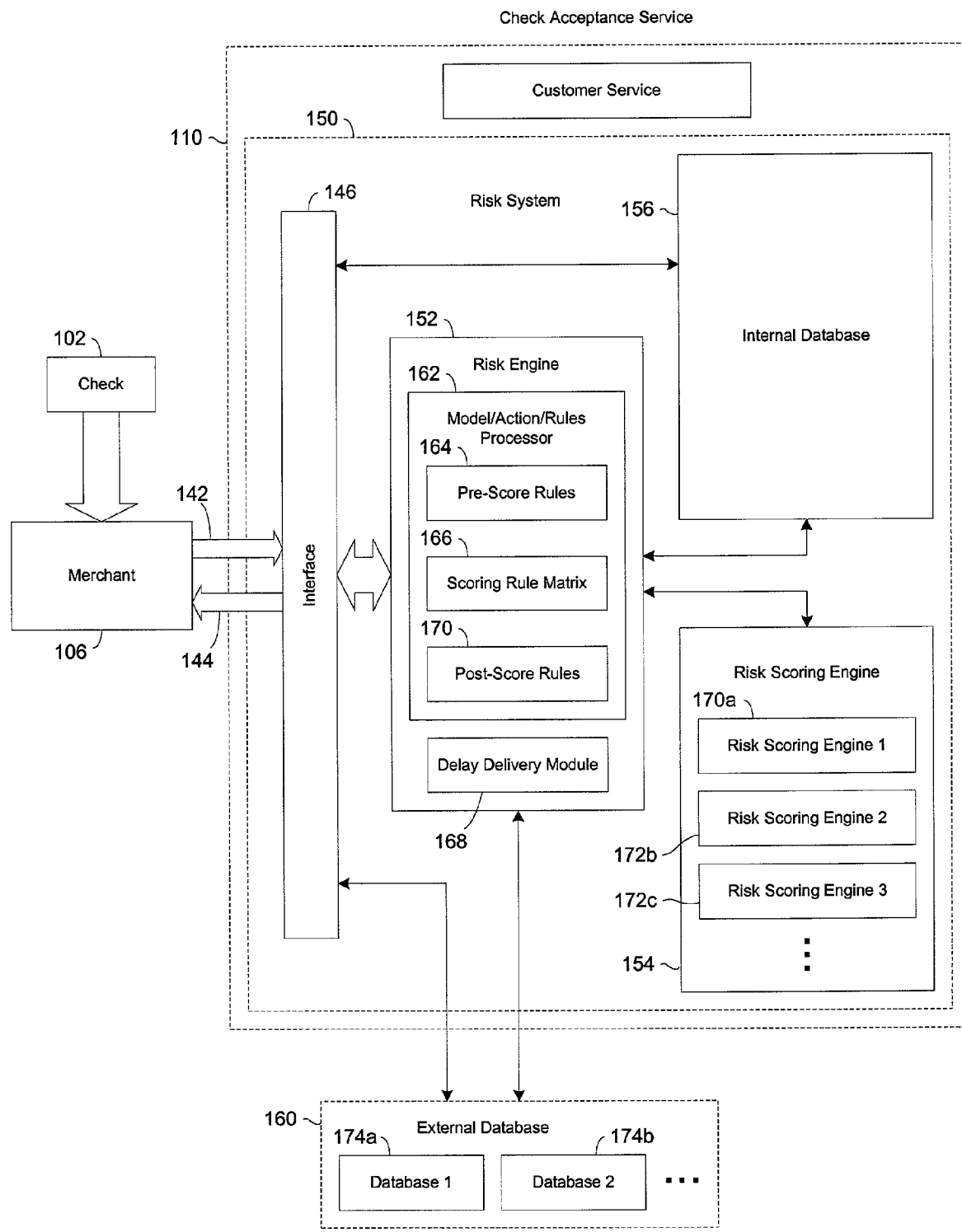
FIG. 2 illustrates one embodiment of a schematic block diagram of the check acceptance service in FIG. 1 including a risk system and a Model/Action/Rules processor.

FIG. 2 illustrates one embodiment of a schematic block diagram of the check acceptance service 110 of FIG. 1. In addition, FIG. 2 further illustrates interaction of the check acceptance service 110 with the merchant 106 and the customer 100 in determining the risk associated with a financial transaction. In one aspect, the merchant 106 receives the check draft 102 from the customer 100, and the merchant 106 electronically interacts with the check acceptance service 110 to determine if the check draft 102 will be accepted or declined. The interaction comprises financial transaction details 142 submitted by the merchant 106 to the check acceptance service 110, and an approve or decline decision 144 provided by the check acceptance service 110 to the merchant 106. The financial transaction details 142 and the approve or decline decision 144 are described in greater detail herein below.

In one aspect, the check acceptance service 110 comprises a risk system 150 that evaluates the risk involved with a given transaction. The risk system 150 interacts with the merchant 106 via a electronic interface 146, such as a telephonic, satellite, and/or computer network (internet) interface. In particular, the interface 146 receives the financial transaction details 142 from the merchant 106 and passes on the information to the risk system 150. Then, the risk system 150 may evaluate the financial transaction in a manner described herein below and returns a decision to the interface 146, which is used to provide the merchant 106 with the desired approve or decline decision 144.

Additionally, the interface 146 may also access and retrieve relevant information about the customer 100, such as check writing history, and/or the merchant 106, such as limit on the check amount acceptable and other specific factors preferences, from an internal database 156 and evaluate the customer and/or merchant parameters so as to permit configuring the manner in which the risk assessment is performed by the risk system 150. Additionally, the risk system 150 is also configured so as to permit accessing of an external database 160, which may comprises a plurality of external databases 174a, 174b, etc. The external database 160 permits the risk engine 152 to gather relevant transaction information about the customer 100 and the merchant 106 that may not necessarily be available in the internal database 156, so as to further facilitate the risk assessment.

Moreover, the risk system 150 further comprises a risk engine 152 that evaluates the risk assessment of the financial transaction based on the financial transaction details 142 or transaction data transferred from the interface 146, the internal database 156, and the external database 160. In addition, the risk scoring engine 154 may determine a risk score at the request of the check acceptance service 110 and returns the risk score indicative of a probable risk assessment of the financial transaction. Advantageously, the risk scoring engine 154 may comprise a plurality of scoring engines 172a, 172b, 172c, etc., wherein each risk engine is adapted to address a plurality of possible financial transactions or transaction variables in a manner so as to permit improved accuracy in determining the risk score. Various types of scoring engines that may be utilized by the risk engine will be described in greater detail herein below. In addition, a preferred financial transaction that illustrates selective use of the plurality of scoring engines will be described in greater detail herein below.

Furthermore, the risk engine 152 further comprises a Model/Action/Rules processor 162 that may be utilized to evaluate the transaction risk and may determine whether to approve or decline the financial transaction. The processor 162 comprises a pre-score rules module 164, a scoring rule matrix module 166, a post-score rules module, and a delay delivery module 168. The pre-score rules module 164 is utilized to initially determine whether risk evaluation needs to performed. For example, the risk engine may access the internal database 156 for transaction information about the customer, and ascertains that the customer 100 is associated with a hard negative check writing history. In this particular case, the hard negative check writing history arises from writing one or more non-clearable check drafts and, in some cases, refuses to provide legitimate compensation during the collection process. As a result, the pre-score rules module 164 may then decide that the financial transaction is of high risk and, in which case, subsequently declines authorization due to an unacceptable risk assessment ascertained for the customer 100.

Additionally, the scoring rule matrix module 166 includes a plurality of rules and utilizes the plurality of rules for the purpose of selecting a relevant scoring engine to obtain an initial risk score. Based on the initial risk score, the scoring rule matrix module 166 may approve or decline the financial transaction.

Furthermore, the post-score rules module 170 may be utilized to evaluate the initial risk score, that was generated by the scoring matrix 166, to determine if further risk assessment needs to be performed. In particular, the post-score rules module 170 may selectively determine a second scoring engine to run so as to obtain an additional risk score. In one embodiment, the additional risk score assessment is performed if the initial risk score leads to a transaction decline according to the scoring rule matrix 166. In another embodiment, the additional risk assessment is performed if the initial risk score falls within a predetermined range of risk score threshold values. It should be appreciated that the additional risk assessment performed selectively may be implemented in any number of situations so as to accurately assess the financial transaction risk.

In one aspect, examples and functionality of an exemplary risk assessment may be configured in accordance with methods described in the Applicant's co-pending U.S. patent application entitled "SYSTEMS AND METHODS FOR SELECTIVE USE OF RISK MODELS TO PREDICT FINANCIAL RISK", Ser. No. 10/041,765 Attorney Docket No. 1DATA.045A, which is incorporated herein by reference in its entirety. Some rules invoke other rules based on simple decisions, and some rules invoke scoring engines to determine risk related factors. It should be emphasized that the rules and the scoring engines illustrated and described in reference to the Applicant's co-pending application are not intended to limit the scope of the risk system. Thus, it should be appreciated that the rules and scoring engines exemplified in the Applicant's co-pending application illustrate one embodiment of the risk assessment associated with the financial transaction described herein below.

The delay delivery module 168 may be utilized to provide the merchant 106 with a notification of provisional authorization. In some cases, if the risk engine 152 determines that the financial transaction maintains a borderline or marginal risk exception condition, then the delay delivery module 168 may issue the notification of provisional authorization to the merchant 106. In one aspect, provisional authorization notifies the merchant 106 that additional risk assessment and evaluation is necessary. The merchant 106 may either delay delivery until the check acceptance service 110 issues a notification of authorization for the financial transaction, or the merchant 106 may elect to deliver the services and/or merchandise after a predetermined period of time if authorization notification was not issued by the check acceptance service 110 during the predetermined period of time.

Additionally, upon receiving the provisional authorization notification, the merchant 106 knows to delay the delivery of services and/or merchandise until further risk analysis may be performed by the risk system 150. In one aspect, it should be appreciated that authorizing delivery after the pre-selected period of time may include agreeing with the merchant 106 that unless the merchant 106 is advised to not deliver the service and/or merchandise at the end of the pre-selected period of time, the delivery of the merchandise is authorized. The advantage is that the merchant 106 retains the services or merchandise, the customer 100 is satisfied with the service, and the check acceptance service 110 is given additional time to evaluate further transaction information, including additional risk assessments, prior to approval or decline. Furthermore, the Advantageously, in financial transactions where the delivery of vendibles 104 may be delayed, such as internet and mail order based financial transactions, the use of provisional authorization inhibits the lost merchandise, dissatisfied customers, and lost revenue for marginal risk assessments. For example, after providing provisional authorization to the merchant 106, the risk system 150 may request additional information about the financial transaction from the merchant 106 and/or the customer 100 via the interface 146 for further risk assessment, or the risk engine 152 may re-score the risk associated with the financial transaction in the risk scoring engine 154. In addition, the risk system 150 may choose to electronically verify the existence of funds in the customer's 100 account prior to notifying the merchant 106 to deliver the vendibles 104 to the customer 100.

Figure 3:
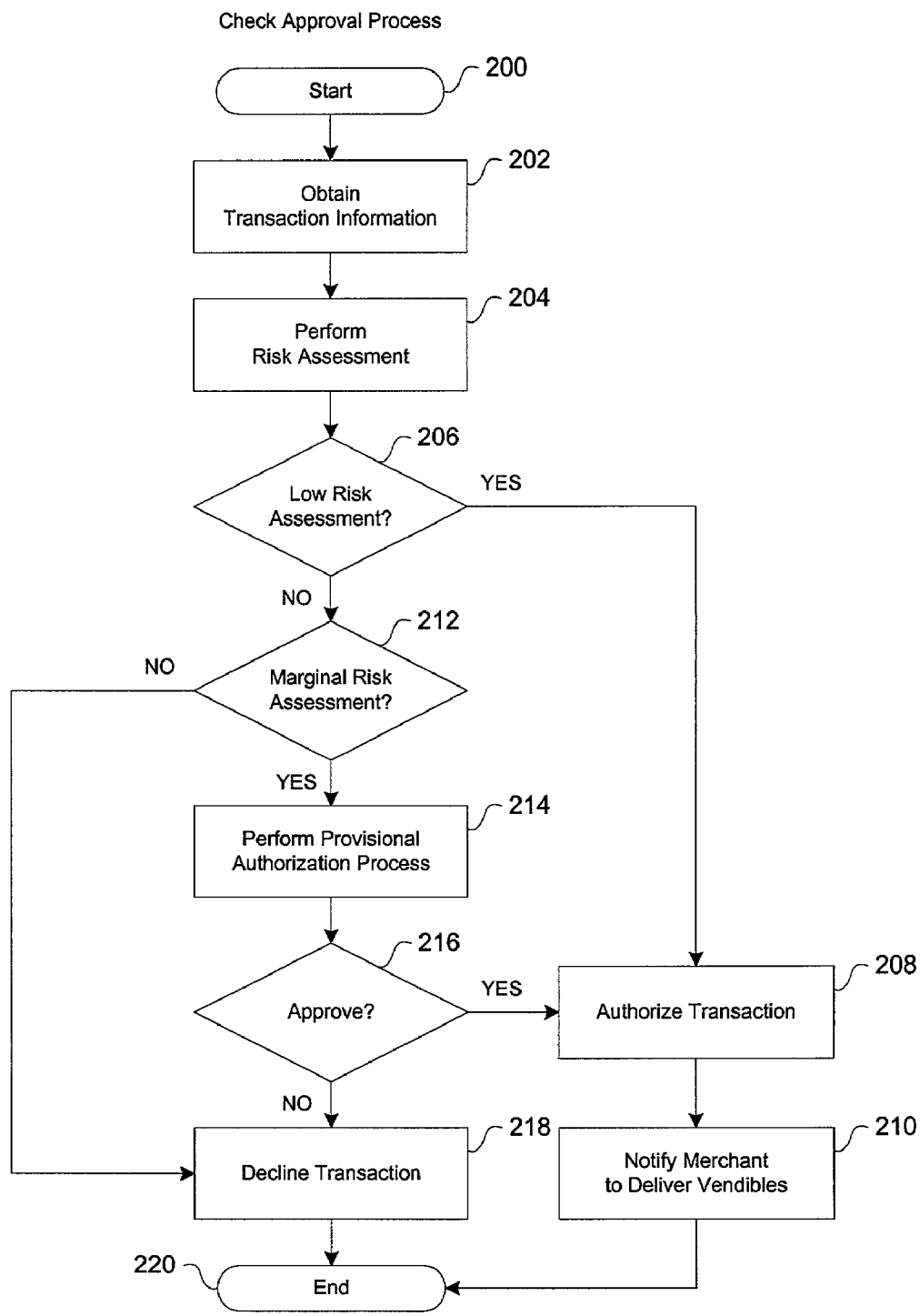
FIG. 3 illustrates one embodiment of a check approval process flow that describes the implementation of one aspect of the present invention by the check acceptance service in FIG. 2.

FIG. 3 illustrates one embodiment of a check approval process performed by the check acceptance service 110 in FIG. 2. The check approval process functionally describes one embodiment of risk assessment, wherein risk scores are utilized to evaluate the degree of risk such that, in marginal risk assessment cases, the risk system 150 may provide the merchant with provisional authorization in a manner as previously described. Additionally, low risk assessment cases are approved and high risk assessment cases are declined in a manner such that the approved or declined status may be based on customer check writing history or some other factor relevant to the risk assessment of the financial transaction between the merchant 106 and the customer 100.

The check approval process initiates in a start state 200 and proceeds to a state 202. In the state 202, the risk system 150 obtains transaction data, information, and other details relating to the financial transaction from the merchant 106 via the interface 146. Related transaction information may include the customer's name, the customer's account number, and the amount of the promissory check or payment. In one aspect, the check acceptance service 110 may obtain the customer's transaction information via the telephone, input on a web page via the internet, or by mail and transfer the information to the risk system 150 via keyboard input. Additionally in the state 202, the check acceptance service 110 may access the merchant 106 record, such as transaction history with a particular customer, and determines the merchant's parameters. The merchant parameters may include thresholds or classifications for determining low, marginal, and high risk assessment values. The merchant parameters may further include desired risk engines, internal databases, and external databases to use when evaluating risk for a particular financial transaction. The merchant record and parameters may be saved in a memory device and accessed whenever the merchant requests approval for a financial transaction.

Next, in a state 204 that follows, the risk system 150 pre-processes the transaction information by generating an initial risk assessment for the financial transaction. Based on the initial risk assessment, the risk system 150 utilizes the risk scoring risk engine 154 to obtain an initial risk score in a manner that will be described in greater detail herein below. Then, the check approval process advances to a decision state 206.

In one aspect, the risk system 150 performs the initial risk assessment in the state 204 as follows. In the state 204, the risk system 150 receives transaction variables and merchant parameters from the interface 146. Then following, the risk system 150 may access the internal database 156 for the transaction records of the customer 100 and the merchant 106. Next, the risk system 150 may decide whether to proceed with the risk evaluation, based on the pre-score rules as described in the Applicant's co-pending U.S. patent application entitled "SYSTEMS AND METHODS FOR SELECTIVE USE OF RISK MODELS TO PREDICT FINANCIAL RISK", Ser. No. 10/041,765 Attorney Docket No. 1DATA.045A. In most instances, a hard negative decision or high risk assessment may lead to an automatic return of an applicable result to the interface 146. Additionally, it should be appreciated that a hard negative or high risk assessment corresponding to the customer 100 may automatically lead to a decline decision status without further action by the risk system 150.

Alternatively, a positive decision leads the risk system 150 to evaluate the financial transaction and select a scoring engine to run based on the transaction variables and the rules of the scoring rule matrix as described in the Applicant's co-pending U.S. patent application entitled "SYSTEMS AND METHODS FOR SELECTIVE USE OF RISK MODELS TO PREDICT FINANCIAL RISK", Ser. No. 10/041, 765 Attorney Docket No. 1DATA.045A. The scoring engine 154 of the risk system 150 scores the transaction risk and returns the risk score in a state 212.

In addition, the risk system 150 evaluates the risk score based on the post-score rules, as described in the Applicant's co-pending U.S. patent application entitled "SYSTEMS AND METHODS FOR SELECTIVE USE OF RISK MODELS TO PREDICT FINANCIAL RISK", Ser. No. 10/041, 765 Attorney Docket No. 1DATA.045A, and determines whether to perform additional risk assessment or suspend the financial transaction for further evaluation, in which case a provisional authorization may be provided to the merchant 106 as previously described. It should be appreciated that a negative decision by the risk system results in the transference of the applicable result to the interface. Otherwise, a positive decision leads the risk system 150 to select another scoring engine for an additional risk assessment.

Following the selection of a scoring engine, the risk system 150 may access external databases for additional transaction information if necessary, and the risk system 150 may perform additional risk modeling or assessment with the selected scoring engine. In addition, the additional risk score resulting from the additional risk modeling may then be evaluated by the risk system 150 based on the post-score rules. At this point, the risk system 150 may determine whether further risk assessment is needed and return the applicable result to the interface 146.

In one embodiment, the additional risk assessment is performed in a manner such that the applicable result is returned after at least two risk assessments. In another embodiment, the additional risk assessment is performed one or more times as needed. It should be appreciated that selective actions taken by the risk system 150 according to the post-score rules may be considered consistent with the scope of the present invention. Thus, even if no additional risk assessment if performed based on the initial risk score and the post-score rule, such as the initial risk score being of high risk or of low risk for example, the selective decision process performed by the risk system is consistent with one aspect of the present invention described herein. It should also be appreciated that, based upon the initial risk score and/or the additional risk score, provisional authorization may be provided to the merchant 106 for the purpose of delaying the delivery of services and/or merchandise in a manner as previously described.

Once the risk assessment is performed and the score is generated in the state 204, the check approval process advances to the decision state 206. In the decision state 206, the risk system 150 determines the degree of the generated risk score. In one aspect, the risk system 150 may compare the initial risk score with a pre-determined range of a low risk assessment threshold. If the processor 162 determines from the comparison that the financial transaction is of low risk, then the check approval process advances to a state 208 to approve the financial transaction. Subsequently, in a state 210, the check acceptance service 110 notifies the merchant 106 to deliver the vendibles, and then the check approval process terminates in an end state 220. It should be appreciated that the pre-determined range of the low risk assessment threshold may comprise any range of values or parameters set by the merchant 106, the check acceptance service 110, and/or any other guidelines available without departing from the scope of the present invention.

Alternatively, in the decision state 206, if the initial risk score fails to fall in the pre-determined range of a low risk assessment threshold, then the check approval process advances to another decision state 212. In the decision state 212, if the risk system 150 compares the initial risk score with a pre-determined range of a marginal risk assessment threshold. If the risk system 150 determines from the comparison that the financial transaction is not of marginal risk, then the check approval process advances to a state 218 to decline the financial transaction. In which case, the check approval process terminates in the end state 220. It should be appreciated that the predetermined range of the marginal risk assessment threshold may comprise any range of values or parameters set by the merchant 106, the check acceptance service 110, and/or any other guidelines available without departing from the scope of the present invention.

Otherwise, if the comparison is determined to comprise a marginal risk assessment score, then the check approval process proceeds to a state 214. In the state 214, the check acceptance service 110 provides the merchant 106 with a provisional authorization in a manner as previously described. As described previously, provisional authorization provides the check acceptance service 110 additional time in a state 214 for further risk assessment, evaluation, and analysis. In the state 254, the risk system 150 performs the provisional authorization process in a manner that will be described in greater detail herein below in reference to FIGS. 4, 5. If, based on the provisional authorization process, approval is authorized in still another decision state 216, then the check approval process advances to the state 208, where the check acceptance service 110 authorizes the financial transaction between the merchant 106 and the customer 100. Then, the merchant 106 is notified by the check acceptance service 110 to deliver the vendibles in the state 210, which is followed by the end state 220. However, if the approval is not granted to the merchant 106 in the decision state 216, then the risk system 150 declines the financial transaction in the state 262, and the check approval process terminates in the end state 264.

In an alternative embodiment, the risk system 150 performs an additional risk score assessment after the initial risk score prior to performing the provisional authorization process in the state 214. In still another embodiment, the risk system 150 may perform a plurality of additional risk assessments for the purpose of more accurately assessing the degree of risk of the financial transaction. In addition, multiple risk assessments may be performed, for example, on financial transactions that involve large check draft amounts. It should be appreciated that the risk system 150 may perform any number of additional risk assessments on any number of types of financial transactions without departing from the scope of the present invention.

Advantageously, the above-mentioned risk assessment procedure, method, and system represents a significant improvement over traditional check handling procedures that automatically approve or decline borderline or marginal risk assessments. Additionally, the above-mentioned risk assessment method and system utilizes an efficient and selective mechanism for evaluating borderline or marginal exception conditions, such as the provisional authorization process. In one aspect, if borderline exception conditions or marginal risk assessment situations arise, the above-mentioned check acceptance procedure, method, and system selectively delays the delivery of services and/or merchandise prior to authorizing the financial transaction.

Figure 4:
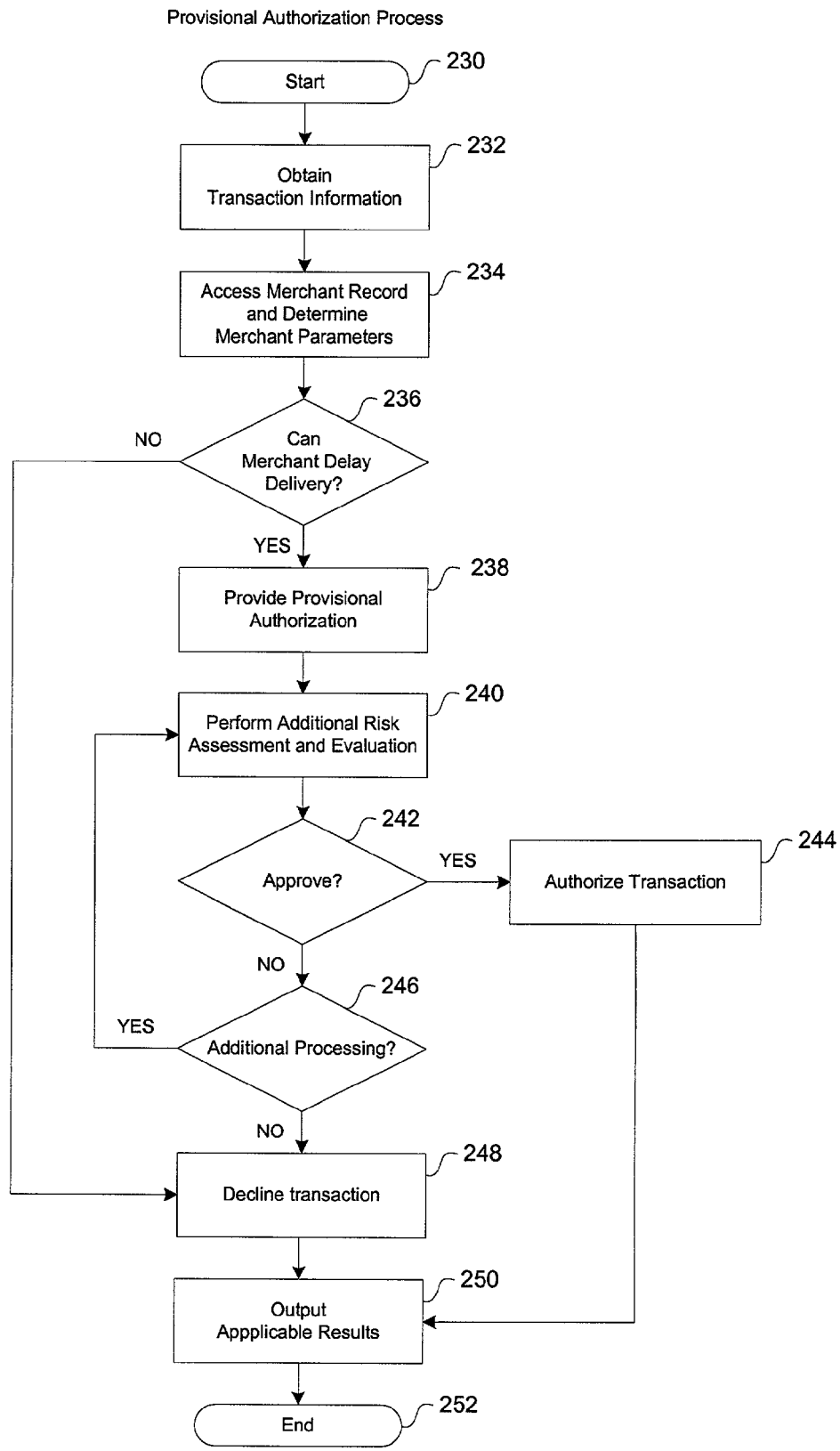
FIG. 4 illustrates one embodiment of a risk assessment process flow that utilizes the risk system, as referenced by FIG. 2, to selectively re-assess the transaction variables, parameters, and information relevant to the financial transaction.

FIG. 4 illustrates one embodiment of a provisional authorization process that is utilized to evaluate marginal risk assessments. The provisional authorization process, as described herein below, is one embodiment of a functional process flow description of the state 214 in FIG. 3. In one aspect, financial transactions that involve promissory payments and marginal risk assessments may require a period of time for further risk evaluation or the verification of funds prior to the release of services and/or merchandise by the merchant 106. Some merchants 106 may elect to be classified by the check acceptance service 110 as capable of delaying the delivery of services and/or merchandise for the purpose of re-evaluating the marginal risk assessments of borderline risk based customers 100. Sometimes a marginally risky customer 100 may make good on their promissory payments. Therefore, a merchant 106 increases its profitability by accepting some marginally risky financial transactions by utilizing the provisional authorization process.

The provisional authorization process initiates in a start state 230, and then advances to a state 232, where the check acceptance service 110 obtains transaction information in a manner as described in the state 202 in FIG. 3. Next, in a state 234, the check acceptance service 110 accesses the merchant 106 record, such as transaction history with the particular customer 100, and determines the merchant's parameters in a manner as described in the state 202 in FIG. 3. Following, in a decision state 236, the check acceptance service 110 determines from the merchant parameters whether the merchant 106 is classified as capable of delaying delivery of services and/or merchandise as previously described in reference to FIGS. 1, 2. Depending on the nature of some businesses, merchants may selectively elect to be classified by the check acceptance agency as either being capable of delaying delivery or not capable of delaying delivery. In addition, the merchant classification may comprise an electronic listing in the internal database 156 or part of the merchant transaction information and/or merchant parameters. Therefore, in the decision state 236, the risk engine 152 may be utilized by the check acceptance service 110 to access the electronic listing in the internal database 156 and perform the determination.

If the check acceptance service 110 determines that the merchant 106 is not capable of delaying delivery in the decision state 236, then the provisional authorization process advances to a state 248, where the financial transaction may be declined. Moreover, if the financial transaction is declined in the state 248, the declined results are electronically transferred to the merchant 106 via the interface 146, and the provisional authorization process terminates in an end state 252. It should be appreciated that the merchant 106 may be notified of the applicable results of the financial transaction via the telephone, satellite relay, standard mail, or the internet without departing from the scope of the present invention.

Alternatively, if the merchant is capable of delaying delivery in the decision state 236, then the provisional authorization process advances to a state 238, where the check acceptance services 110 provides provisional authorization to the merchant 106 in a manner as previously described, such as electronically via the interface 146 or by telephone. By providing provisional authorization to the merchant 106, the check acceptance service 110 is given a period of time, ranging anywhere from a few minutes to several days, to perform additional risk assessment and evaluation in a state 240.

In one aspect, additional risk assessment and evaluation may include verifying the existence of funds in the customer's check issuing bank account in a manner as described in FIG. 1. Furthermore, obtaining additional financial information about the customer in the state 240 may also comprise obtaining information about the customer's recent check writing history and evaluating the customer's recent check writing history to predict whether there will be sufficient finds to cover the cost of the financial transaction. The customer's check writing history may be logged in the internal database 156, the external database 160, and/or saved as a merchant parameter.

In one aspect, as described previously, a notification of provisional authorization informs the merchant 106 that additional risk assessment and evaluation is necessary. In this particular situation, the merchant 106 may either delay delivery until the check acceptance service 110 issues a notification of authorization for the financial transaction, or the merchant 106 may elect to deliver the services and/or merchandise after a pre-determined period of time if authorization notification was not issued by the check acceptance service 110 during the pre-determined period of time. It should be appreciated that the pre-determined period of time may include any length of time ranging from a few seconds to a few weeks.

Additionally, upon receiving the provisional authorization notification, the merchant 106 knows to delay the delivery of services and/or merchandise until further risk analysis is performed by the check acceptance service 110. It should be appreciated that authorizing delivery after the pre-selected period of time may include agreeing with the merchant 106 that unless the merchant 106 is advised to not deliver the service and/or merchandise at the end of the pre-selected period of time, the delivery of the merchandise is authorized.

Moreover, the additional risk assessment and evaluation may require obtaining additional transaction information from the customer 100, such as a driver's license number, a date of birth, a social security number, previous residential addresses, and/or recent check writing history. By obtaining the additional transaction information, the check acceptance service 110 may perform a more in depth risk assessment by generating additional risk scores and accessing more external databases for credit history evaluation, which may result in more successfully avoiding fraud based financial transactions.

Once the additional risk assessment and evaluation is performed in the state 240, approval may be determined in another decision state 242. If the check acceptance service 110 approves the financial transaction in the decision sate 242, the financial transaction is authorized in a state 244, and the approval results are transferred to the merchant 106 in the state 250 in a manner as previously described. Next, the provisional authorization process terminates in the end state 252.

In some cases, if the financial transaction is not approved in the decision state 242, the check acceptance service 110 may decide to perform more additional processing of the risk assessment. This additional processing may include verifying funds in the customer's bank account or waiting for the check to cleared in a check clearing process in a manner as previously described. If additional processing may be performed, then the processing is performed in the state 240. Otherwise, if additional process may not be performed the financial transaction is declined in the state 248, the applicable results are sent to the merchant 106, and the provisional authorization process terminates in the end state 252.

Advantageously, the provisional authorization process may be utilized to increase revenue in financial transactions where marginal risk assessments occur. For example, internet and mail order based merchants may substantially increase profits by integrating the provisional authorization process into practice. In one aspect, customers that order vendibles, such as services and/or merchandise, over the internet often expect to wait for delivery. As a result, the internet is one embodiment of a preferred application of the provisional authorization process, which will be described in greater detail herein below in FIG. 5.

Figure 5:
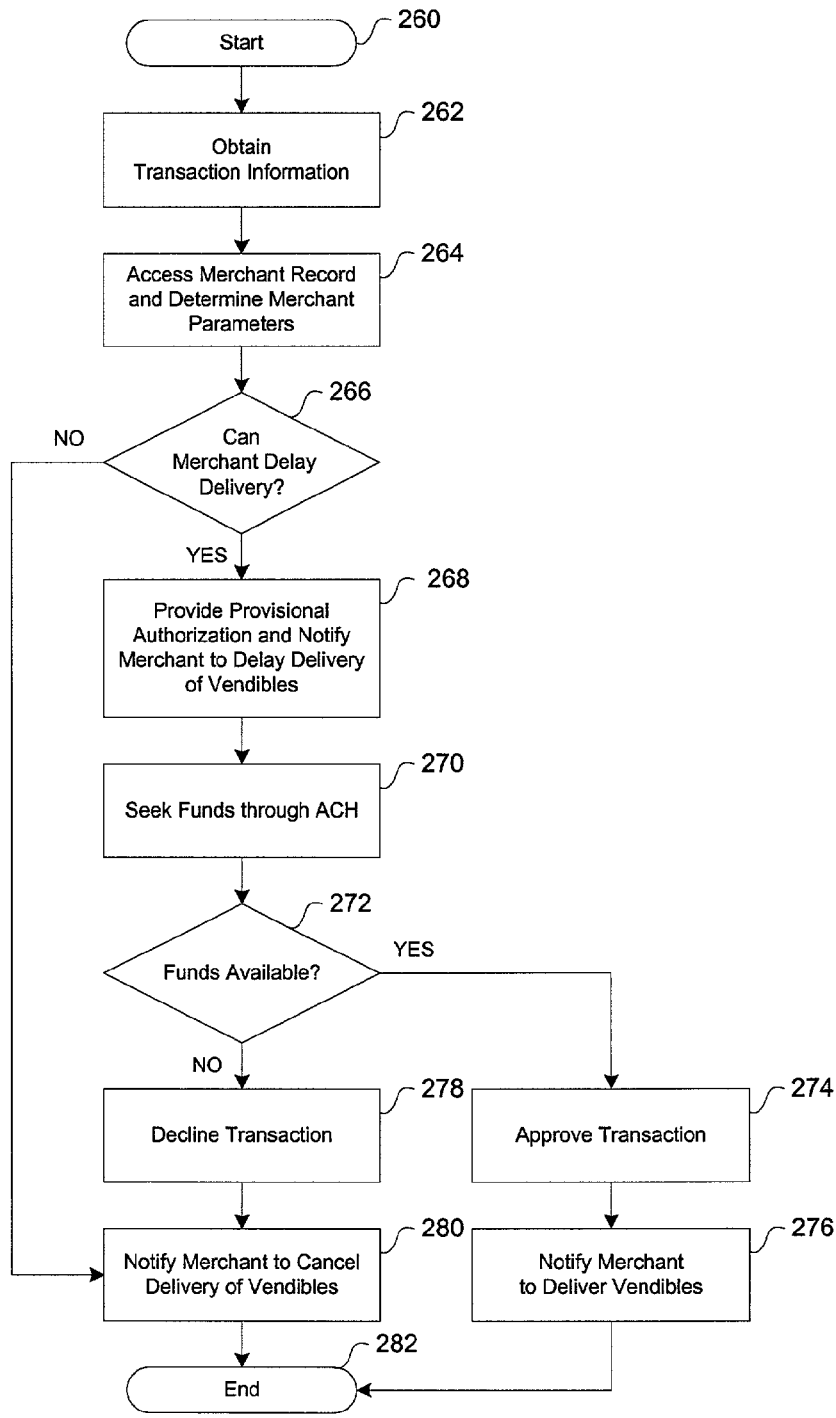
FIG. 5 illustrates one embodiment of a check approval process performed by the Model/Action/Rules processor as referenced by the risk system in FIG. 2.

FIG. 5 illustrates one example of an application of the provisional authorization process in FIG. 4 to an internet based financial transaction. The internet based provisional authorization process, as described herein below, is one embodiment of a functional process flow description of the state 214 in FIG. 3 and the provisional authorization process in FIG. 4. In one aspect, internet based financial transactions that involve promissory payments, electronic or otherwise, and marginal risk assessments may require a period of time for further risk evaluation or the verification of funds prior to the release and delivery of services and/or merchandise. By nature of the internet business, internet based merchants 106 are usually classified by the check acceptance service 110 as capable of delaying the delivery of services and/or merchandise. For the purpose of re-evaluating marginal risk assessments of borderline risk based customers 100, the typical internet based merchant 106 may substantially increase profitability by accepting some marginally risky financial transactions via the utilization of the provisional authorization process as described in FIG. 4.

The internet based provisional authorization process initiates in a start state 260. In a state 262, the check acceptance service 110 electronically obtains transaction information from the customer 100 via the merchant's web page or an email attachment. For privacy reasons, sometimes a customer 100 may choose to submit transaction information via the telephone. Next, in a state 264, the check acceptance service 110 electronically obtains the merchant record and parameters from the internal database 156. The check acceptance service 110 determines in a decision state 266 that delivery of vendibles 106 may be delayed. In this particular embodiment, the check acceptance service 110 previously determined that the internet based financial transaction is marginally risky by utilizing the check approval process in FIG. 3. It should be appreciated that a low risk assessment results in approval, and a high risk assessment results in a decline.

As a result of determining a delayed delivery in the decision state 266, the check acceptance service 110 provides provisional authorization to the merchant 106 in a state 268, which notifies the merchant 106 to delay delivery of the vendibles 106 until funds in the customer's banking account are verified in a state 270. In this particular embodiment, the check acceptance service 110 seeks funds through the automatic clearing house (ACH) as previously described in FIG. 1. In another embodiment, the check acceptance service 110 may contact via the telephone the customer's check issuing bank 116 to verify funds in the customer's banking account.

If the funds are determined available in another decision state 272, then the internet based financial transaction is approved in a state 274, the merchant 106 is notified via telephone, email, or otherwise to deliver the vendibles 106 to the customer 100, and the internet based provisional authorization process terminates in an end state 282. Otherwise, in the decision state 272, if the funds are not available in the customer's banking account, then the financial transaction is declined in a state 278, and the merchant 106 is notified via telephone, email, or otherwise to cancel the delivery of the vendibles 106 to the customer 100 in a state 280. Following the state 280, the internet based provisional authorization process terminates in the end state 282.

Advantageously, the above-mentioned risk assessment procedure, method, and system represents a significant improvement over traditional check handling procedures that automatically approve or decline marginally risky financial transactions or require the transfer of a paper check among various financial institutions. For example, the above-mentioned risk assessment method and system utilizes an efficient and selective mechanism for evaluating borderline exception conditions and marginal risk assessments, such as utilizing the provisional authorization process in borderline risk transactions with marginal risk scores. In one aspect, if marginal risk assessment situations arise, the above-mentioned check acceptance procedure, method, and system selectively delays the delivery of services and/or merchandise prior to authorizing the financial transaction in a manner such that the customer is marginally inconvenienced, the merchant retains the vendibles, and the check acceptance service reduces the potential loss of funds.

Although the following description exemplifies one embodiment of the present invention, it should be understood that various omissions, substitutions, and changes in the form of the detail of the apparatus, system, and/or method as illustrated as well as the uses thereof, may be made by those skilled in the art, without departing from the spirit of the present invention. Consequently, the scope of the present invention should not be limited to the disclosed embodiments, but should be defined by the appended claims.

What is claimed is:

1. A method of assessing risk associated with a financial transaction, wherein a customer is attempting to pay for vendibles from a merchant via a promissory payment, the method comprising:
   (i) receiving transaction information from the merchant at a point of sale, wherein the transaction information identifies the customer, the merchant, and includes data about the financial transaction;
   (ii) assessing the risk of the financial transaction using at least one mathematically based scoring engine to obtain a risk value;
   (iii) determining if the risk value indicates that the risk is in a first classification of risk wherein additional information about the customer may result in the risk value being positioned within a second classification of risk for which acceptance of the promissory payment as payment for the vendibles is warranted;
   (iv) provisionally authorizing acceptance of the promissory payment if the determination in act (iii) indicates that the risk value is in the first classification;
   (v) communicating the provisional authorization to the merchant at the point of sale to thereby indicate to the merchant to accept the promissory payment but to hold delivery of the vendibles for a pre-selected period of time;
   (vi) obtaining additional financial data about the customer during the pre-selected period of time to determine if the risk value can be positioned within the second classification; and
   (vii) authorizing delivery of the vendibles after the pre-selected period of time when the additional financial data about the customer indicates that the risk value can be positioned in the second classification.

2. The method of claim 1, further comprising determining if the merchant is a merchant who can delay delivery of the vendibles.

3. The method of claim 2, wherein act (v) of communicating the provisional authorization to the merchant occurs only if the merchant is determined to be a merchant who can delay delivery of the vendibles.

4. The method claim 1, wherein assessing risk associated with the financial transaction is assessing risk associated with an internet based financial transaction.

5. The method claim 1, wherein assessing risk associated with the financial transaction is assessing risk associated with a mail order based financial transaction.

6. The method of claim 1, wherein authorizing delivery after the pre-selected period of time comprises contacting the merchant and advising the merchant to deliver.

7. The method of claim 1, wherein authorizing delivery after the pre-selected period of time comprises agreeing with the merchant that unless the merchant is advised to not ship at the end of the pre-selected period of time, the delivery of the vendibles is authorized.

8. The method of claim 7, wherein the pre-selected period of time ranges from at least one micro-second to a few weeks.

9. The method of claim 1, wherein obtaining additional financial information about the customer comprises verifying availability of funds in a checking account belonging to the customer to cover the cost of the financial transaction.

10. The method of claim 1, wherein obtaining additional financial information about the customer comprises obtaining information about the customer's recent check writing history and evaluating the customer's recent check writing history to predict whether there will be sufficient funds to cover the cost of the financial transaction.

11. The method claim 1, wherein attempting to pay via the promissory payment comprises attempting to pay via a check.

12. The method claim 8, wherein attempting to pay via the check comprises attempting to pay via an electronic check.

13. The method claim 8, wherein attempting to pay via the check comprises attempting to pay via a paper check.

14. The method claim 1, wherein attempting to pay for vendibles comprises attempting to pay for merchandise.

15. The method claim 1, wherein attempting to pay for vendibles comprises attempting to pay for services.

16. The method of claim 1, wherein determining if the risk value indicates that the risk is in the first classification comprises assessing a marginal risk assessment, wherein the marginal risk assessment is between a low risk assessment and a high risk assessment.

17. The method of claim 1, wherein determining if the risk value indicates that the risk is in the second classification comprises assessing a low risk assessment.

18. A method of approving a financial transaction, wherein a customer offers payment to a merchant in exchange for vendibles, the method comprising:
performing a risk assessment of the financial transaction using at least one scoring engine to generate a risk score based on transaction information obtained from the merchant, wherein the transaction information identifies the customer, the merchant, and includes data about the financial transaction;
determining a marginal risk assessment if the risk score is in a borderline classification of risk, wherein additional information about the customer may result in the risk score being positioned within a low classification of risk for which acceptance of the payment for the vendibles is authorized;
instructing the merchant at the point of sale to accept the promissory payment but to delay delivery of the vendibles for a period of time, wherein, during the period of time, additional financial data about the customer is obtained to re-assess the risk associated with the financial transaction; and
authorizing delivery of the vendibles after the period of time when the additional financial data about the customer indicates that the risk score can be positioned in the low classification of risk.

19. The method of claim 18, wherein the method further comprises determining if the merchant is a merchant who can delay delivery of the vendibles.

20. The method of claim 19, wherein determining a marginal risk assessment occurs only if the merchant is determined to be a merchant who can delay delivery of the vendibles.

21. The method claim 18, wherein approving the financial transaction comprises approving an internet based financial transaction.

22. The method claim 18, wherein approving the financial transaction comprises approving a mail order based financial transaction.

23. The method of claim 18, wherein authorizing delivery after the period of time comprises contacting the merchant and advising the merchant to deliver the vendibles to the customer.

24. The method of claim 18, wherein authorizing delivery after the period of time comprises agreeing with the merchant that unless the merchant is advised to not ship at the end of the period of time, the delivery of the vendibles is authorized.

25. The method of claim 18, wherein the period of time ranges from at least one micro-second to a few weeks.

26. The method of claim 18, wherein obtaining additional financial data about the customer comprises verifying availability of funds in a checking account belonging to the customer to cover the cost of the financial transaction.

27. The method of claim 18, wherein obtaining additional financial data about the customer comprises obtaining information about the customer's recent check writing history and evaluating the customer's recent check writing history to predict whether there will be sufficient funds to cover the cost of the financial transaction.

28. The method claim 18, wherein offering the payment comprises offering a promissory payment.

29. The method claim 18, wherein offering the promissory payment comprises offering an electronic payment.

30. The method claim 18, wherein offering the payment in exchange for vendibles comprises offering payment in exchange for merchandise.

31. The method claim 18, wherein offering the payment in exchange for vendibles comprises offering payment in exchange for services.

32. The method of claim 18, wherein obtaining additional transaction information about the customer comprises obtaining information about the customer's recent check writing history and evaluating the customer's recent check writing history to predict whether there will be sufficient funds to cover the cost of the financial transaction.

33. The method claim 18, wherein exchanging the customer payment comprises exchanging a promissory payment.

34. The method claim 18, wherein exchanging the customer payment comprises exchanging an electronic payment.

35. The method claim 18, wherein exchanging the customer payment for merchant vendibles comprises exchanging payment for merchandise.

36. The method claim 18, wherein exchanging the customer payment for merchant vendibles comprises exchanging payment for services.

37. A method of approving an internet based financial transaction between a customer and a merchant, wherein a customer payment is exchanged for merchant vendibles, the method comprising:
performing a risk assessment of the internet based financial transaction using transaction information obtained from the customer and the merchant and a scoring engine to generate a risk score, wherein, if the risk score is classified as low risk, the internet based financial transaction is approved, and wherein, if the risk score is classified as high risk, the internet based financial transaction is declined, and wherein if the risk score is classified as moderate risk the internet based financial transaction is provisionally authorized;
delaying delivery of the merchant vendibles for a period of time when the internet based financial transaction is provisionally authorized, wherein additional transaction information is obtained from the customer during the period of time to determine if the internet based financial transaction can be classified as low risk; and
authorizing delivery of the merchant vendibles after the period of time when the additional transaction information from the customer indicates that the risk score of the internet based financial transaction can be classified as low risk.

38. The method of claim 37, wherein approving the internet based financial transaction comprises approving a mail order based financial transaction.

39. The method of claim 37, wherein authorizing delivery after the period of time comprises contacting the merchant and advising the merchant to deliver the vendibles to the customer.

40. The method of claim 37, wherein authorizing delivery after the period of time comprises agreeing with the merchant that unless the merchant is advised to not ship at the end of the period of time, the delivery of the vendibles is authorized.

41. The method of claim 37, wherein the period of time ranges from at least one micro-second to a few weeks.

42. The method of claim 37, wherein obtaining additional transaction information about the customer comprises verifying availability of funds in a checking account belonging to the customer to cover the cost of the financial transaction.

43. A system of assessing risk associated with a financial transaction, wherein a customer is attempting to pay for vendibles from a merchant via a promissory payment, the system comprising:
 a risk assessment component that is configured to perform a risk assessment of the financial transaction using at least one scoring engine to generate a risk score based on transaction information obtained from the merchant via an interface component, wherein the transaction information identifies the customer, the merchant, and includes data about the financial transaction;
 a processing component that is configured to determine a marginal risk assessment if the risk score is in a borderline classification of risk, wherein additional customer information may result in the risk score being positioned within a low classification of risk for which acceptance of the promissory payment for the vendibles is authorized; and
 a communications component that is configured to communicate with the merchant, wherein the communication component notifies the merchant at a point of sale, and wherein the notification instructs the merchant to accept the tendered promissory payment but to delay delivery of the vendibles for a period of time, wherein, during the period of time, additional financial data about the customer is obtained via the interface device to re-assess the risk associated with the financial transaction.

44. The system of claim 43, wherein the system further comprises an authorization component that is configured to authorize delivery of the vendibles after the period of time when the additional financial data about the customer indicates that the risk score can be re-positioned in the low classification of risk.

45. The system of claim 44, wherein the authorization component further comprises a communications device and contacts the merchant via communications medium and advises the merchant to deliver the vendibles to the customer.

46. The system of claim 44, wherein the authorization component authorizes the delivery of the vendibles after the period of time unless the merchant is advised to not ship at the end of the period of time by the authorization component.

47. The system of claim 43, wherein the processing component is further configured to determine if the merchant is a merchant who can delay delivery of the vendibles.

48. The system of claim 47, wherein the processing component determines the marginal risk assessment only if the merchant is determined to be a merchant who can delay delivery of the vendibles.

49. The system claim 43, wherein the financial transaction is an internet based financial transaction.

50. The system claim 43, wherein the financial transaction is a mail order based financial transaction.

51. The system of claim 43, wherein the period of time ranges from at least one micro-second to a few weeks.

52. The system of claim 43, wherein the system acquires additional customer information and verifies the availability of funds in a checking account belonging to the customer to cover the cost of the financial transaction.

53. The system of claim 43, wherein the additional customer information comprises transaction information about the customer's recent check writing history.

54. The system of claim 53, wherein the processing component evaluates the customer's recent check writing history to predict whether there will be sufficient funds to cover the cost of the financial transaction.

55. The system claim 43, wherein the marginal risk assessment is between a low risk assessment and a high risk assessment.

56. The system claim 43, wherein the promissory payment comprises an electronic payment.

57. The system claim 43, wherein the promissory payment comprises a check.

58. The system claim 57, wherein the check comprises an electronic check.

59. The system claim 57, wherein the check comprises a paper check.

60. The system claim 43, wherein the vendibles comprise merchandise.

61. The system claim 43, wherein the vendibles comprise services.

* * * * *